July 21, 1931.                    W. K. ROYCE                    1,815,588
                                   FASTENER
                              Filed Oct. 24, 1928
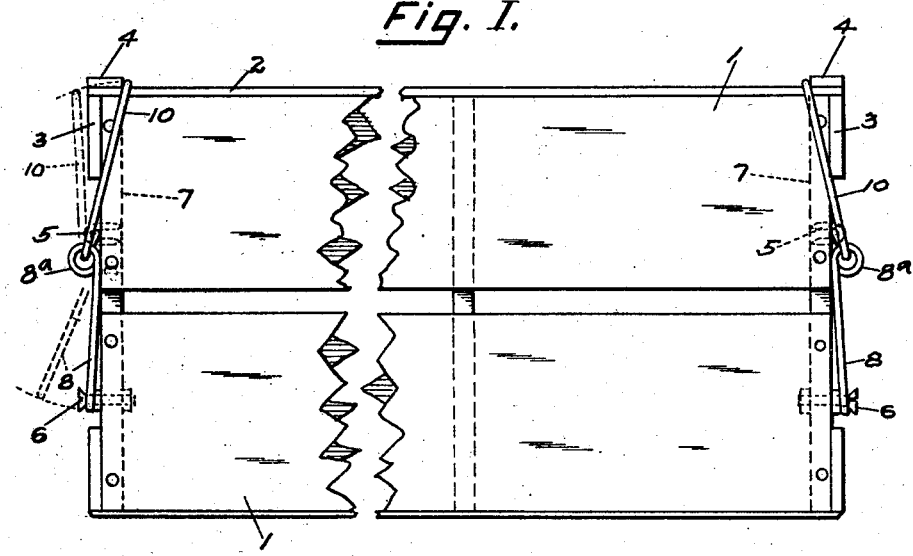
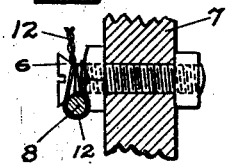
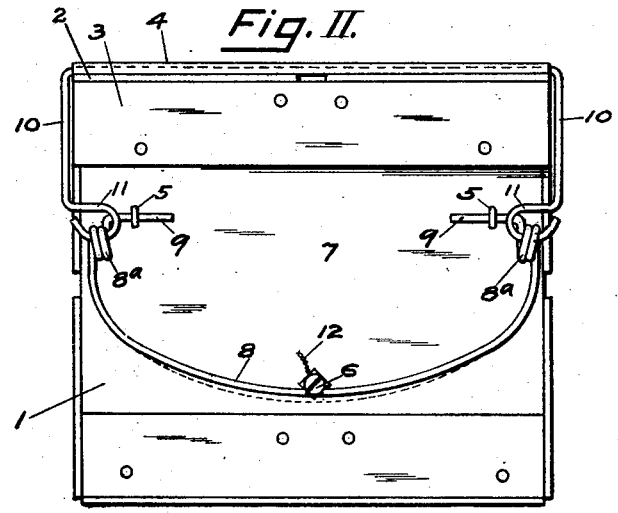
W. KENNETH ROYCE.
*Inventor.*
By R.C.Wright
*Attorney.*

Patented July 21, 1931

1,815,588

UNITED STATES PATENT OFFICE

WILLARD KENNETH ROYCE, OF CLACKAMAS, OREGON

FASTENER

Application filed October 24, 1928. Serial No. 314,658.

My invention is included in crate or box fasteners as a class.

The object of my invention is to provide a device whereby a cover may be fastened securely over the opening of a crate or box without the use of nails or like fastening means. The device is applied to each end of the crate and embraces novel and useful features. My primary intention is to apply this device to crates of common type used for the shipment of eggs therein. It may be of course applied to crates employed for other purposes. These objects, as well as others, I attain by the construction, arrangement and application of my device, hereinafter described, and as illustrated in the accompanying drawings which form a part hereof.

Fig. I is a side elevation of a crate with my device in fastened position on each end of the crate, which is broken away near its center.

Fig. II is an end elevation of a crate with the device in fastened position thereon.

Fig. III is an enlarged detail view of the screw upon which the bail is fastened, together with wire for locking the bail on the screw.

Like characters refer to like parts in the views.

A crate 1, such as may be employed for the transportation of eggs, is shown in Figs. I and II. It has a cover 2, the ends of which extend over the battens 3 on the end walls of crate when in covering position. Along the upper surface of the cover 2 at each end thereof cleats 4 are rigidly secured. The device is the same at each end. Two staples 5 are secured upon the ends of the crate in a convenient position in alignment and with relation to each other, their outer ends being slightly above the crate surface. Below the staples, and centrally between them, a screw 6 is rigidly secured in the crate end 7 with the screw head slightly above the crate surface. A flexible operating bail 8 has inwardly turned ends 9 adapted to pass through the staples and hingedly mounting the bail therein. The bail has integral eyes 8a near the angles of its inwardly turned ends. A clamping member or bail 10 is of rectangular form, adapting it to be moved over the end of the crate cover and to a position where it can engage the cleat 4 and cover when drawn to the cover surface adjacent. The member 10 has inwardly ends terminating in hooks 11 arranged and adapted to engage the opposing eyes 8a of the bail 8. When the bail 8 is not under tension by being pulled over and engaged with the screw 6 it remains a convenient distance from the screw and toward the cover. To prevent the bail from being taken off the screw, a small wire 12 of a form shown in Fig. III is looped over the screw, down and back under the bail and over the screw, the ends being twisted to an inward engagement with the screw. This wire is also adapted and intended to receive a metal seal if it is desired to protect the fastener from being tampered with. When the bail is released from the screw, its movement to fasten the cover, and also that of the member 10, are shown by dotted lines in Fig. I. When the bail is released the whole apparatus can be removed easily by sliding the bail ends out of the staples.

The operation is very obvious. The bail being inserted in the staples it moves hingedly. The member 10 being hooked in the bail eyes is hingedly mounted therein. While in released position the member 10 is drawn easily to engagement with the cover and its cleats. The bail is drawn over the screw and this secures the member 10 in fastening position. If it is desired to prevent the bail from being displaced from the screw, the wire 12 serves this purpose and it in turn may be sealed to guard against tampering.

The device can be adapted to any crate having a cover occupying the area of the crate opening. The cleats, fastening screws and staples only are required on the crate. The apparatus is simple and cheap of construction and can be placed easily and quickly on the crate as shown. The cover can thus be quickly fastened without nailing and released as quickly. The device is new and useful. It will greatly facilitate and speed up the shipment and handling of eggs, as also lessen the expense thereof.

I claim:

1. A fastening device having therein the combination of; a flexible bail formed with a right angled part adapted so as transversely and rigidly to engage a flat opposing surface, also having a hinging hook at right angles on each free end, a staple positioned conveniently near each end of the bail, a flexible locking member formed with double rings near each end which hingedly engage the opposing bail hooks, the ends of the member extending at right angles to a rotative position within the opposing staples, the member being adapted so as to remain at a slight angle to the bail when in locking position, and a screw rigidly positioned in alignment with the center of said member and adapted to receive the member on one side of the screw in a pre-determined tension produced position.

2. A fastening device having therein the combination of; a flexible bail formed with a right angled part adapted so as transversely and rigidly to engage a flat opposing surface, also having a hinging hook at right angles on each free end, a staple positioned conveniently near each end of the bail, a flexible locking member formed with double rings near each end which hingedly engage the opposing bail hooks, the ends of the member extending at right angles to a rotative position within the opposing staples, the member being adapted so as to remain at a slight angle to the bail when in locking position, a screw rigidly positioned in alignment with the center of said member and adapted to receive the member on one side of the screw in a pre-determined tension produced position, and a sealing means consisting of a wire positioned about the member and the screw, with its free ends spirally twisted to each other, so as to retain the member and screw in rigid engagement while the wire is so positioned.

W. KENNETH ROYCE.